United States Patent [19]

Kruger

[11] Patent Number: 4,754,983
[45] Date of Patent: Jul. 5, 1988

[54] SEALING APPARATUS BETWEEN ROTATABLE COAXIAL INNER AND OUTER SHAFTS OF A GAS TURBINE ENGINE

[75] Inventor: Wolfgang Kruger, Reichertshausen, Fed. Rep. of Germany

[73] Assignee: MTU Motoren- und Turbinen-Union Munchen GmbH, Munich, Fed. Rep. of Germany

[21] Appl. No.: 938,587

[22] Filed: Dec. 5, 1986

[30] Foreign Application Priority Data

Apr. 12, 1985 [DE] Fed. Rep. of Germany ....... 3542826

[51] Int. Cl.⁴ .............................. F16J 9/06; F16J 15/42
[52] U.S. Cl. ........................................ 277/25; 277/149
[58] Field of Search ................ 277/149, 25, 13, 14 R, 277/14 V, 98, 193, 195, 44, 45

[56] References Cited

U.S. PATENT DOCUMENTS

| | | | |
|---|---|---|---|
| 2,589,274 | 3/1952 | Moratta | 277/149 |
| 3,306,620 | 2/1967 | Taschenberg | 277/98 X |
| 4,047,742 | 9/1977 | Haferkamp | 277/149 X |
| 4,384,729 | 5/1983 | Birenbaum | 277/197 |

Primary Examiner—Stuart S. Levy
Assistant Examiner—Lynn M. Sohacki
Attorney, Agent, or Firm—Roberts, Spiecens & Cohen

[57] ABSTRACT

Sealing apparatus between inner and outer coaxial rotating shafts in which two sealing rings sealingly contact each other along confronting circumferential surfaces. In a position of rest, the rings surround the inner shaft with a predetermined circumferential sealing clearance of rotational symmetry. The sealing rings are supported in axially resilient manner between radial walls of a housing secured to the outer shaft which walls partly span the distance between the shafts. The sealing rings are pivotally connected to the housing for movement about pivot axes which are preferably 180° apart from each other and, under the action of centrifugal force during rotation of the outer shaft, the rings pivot laterally towards surfaces of the housing to take up predetermined outer circumferential clearances of rotational symmetry between the outer periphery of the rings and the housing. The sealing rings are held in the housing by resilient elements which bias the rings into positions in which all clearances are rotationally symmetrical in the position of rest.

20 Claims, 5 Drawing Sheets

A = B

SEALING APPARATUS BETWEEN ROTATABLE COAXIAL INNER AND OUTER SHAFTS OF A GAS TURBINE ENGINE

FIELD OF THE INVENTION

The invention refers to a sealing or packing apparatus which can be placed between rotatable coaxial inner and outer shafts of a gas turbine engine.

BACKGROUND

Such apparatus is referred to technically as a "between the shafts packing". It serves, among other things, to separate rotor regions from one another with minimum leakage losses, the rotor regions containing the same or different fluids, for example, gas/gas or gas/oil in turbo-engines, such as gas turbine power plants. In multi-shaft gas turbine jet engines, hollow shafts are used, for example, for conducting turbine cooling air, bearing chamber barrier air, rotor-stator barrier sealing air or deicing air which has been branched off from the compressor. In this regard, for example, the branched-off air must frequently be fed from an outer shaft to an inner shaft and then back out from the inner shaft. Rotor sections are used in which rotating shafts overlap one another and the branched-off air must be capable of being conducted with minimum leakage within the associated path at the operating pressure and velocity in order not to impair the aero-thermodynamic cyclic process of the engine and to prevent possible mechanical damage to the power plants especially the bearings.

Sealing apparatus for the above use is known in which labyrinth seals, radially wiping seals and axial/radial sliding-ring seals are utilized.

Improvements in such sealing apparatus have been sought to minimize susceptibility of leakage and wear especially at high shaft speeds and temperatures but these have led to complex constructions which are susceptible to breakdown and are difficult to assemble. Furthermore, the improvements frequently didn't accommodate relative axial displacements of the shafts.

This is particularly of labyrinth seals which require a comparatively precise adaptation of the ends of the sealing numbers which engage in interdigitated manner with each other, in order to achieve improvements with respect to the susceptibility to leakage.

Radial wiping seals permit limited relative axial displacements between two shafts but, in general, cannot handle relatively high shaft speeds of rotation and are comparatively difficult to assemble since a leather or rubber-like packing ring is forced, by means of a special tool, with plastic deformation, into an undercut arrangement in a correspondingly preshaped cutout in the housing and then must be secured in place as well as coaxially coupled to the shaft by a coaxial connecting spring.

An essential disadvantage of the axial/radial planar ring seal is the necessity of using slit packing rings and the additional points of leakage which are thus formed. Furthermore, problems arise from this type of sealing apparatus with respect to the required run-in precision and the wear on the axial alide surface, which applies in similar manner also, for example, to pure axial sliding ring seals.

Also known are gas or hydrodynamically operating sliding ring seals between the rotor and stator of a corresponding turbo-engine which, in order to minimize the wear of corresponding radial sealing surfaces, require a lubrication sealing clearance construction which is controlled fluidly or thermally. The sealing apparatus requires the formation of lubricant application pockets along the sliding surfaces and peripheral cooling channels in the rotating sealing ring which makes such sealing apparatus comparatively difficult to construct and expensive.

SUMMARY OF THE INVENTION

An object of the present invention is to provide sealing apparatus which is suitable for the same or opposite directions of rotation of the shafts and which, with extremely small leakage and unimpeded axial displaceability of the shafts is, at the same time, easy to assemble and of low wear.

This object is achieved in accordance with the invention by a construction of the sealing apparatus which comprises two sealing rings mounted on one of two coaxial rotatable shafts, the sealing rings being adjacent to one another coaxially around the common axis of rotation of the shafts to form a uniform circumferential sealing clearance with the other of the shafts. The rings have circumferential confronting surfaces which abut one another in sealing relation. A housing is secured to said one shaft and includes two axially spaced walls extending radially towards the other shaft into spaced relation therewith. A spring resiliently biasses the sealing rings axially between said walls. A support means supports said rings in said housing for pivotal movement about respective pivot axes which are angularly offset from one another, said rings being supported by said support means to form a second circumferential clearance with the housing. The pivot axis of each ring is radially offset from the common axis of rotation of the shafts such that in operation, when at least said one shaft is rotated, the rings will be displaced under the effect of centrifugal force around said pivot axes within the confines of said second circumferential clearance. A spring means extends between said housing and said sealing rings for urging said rings to a biassed position in which, when the shafts are at rest, said first and second circumferential clearances are each of uniform width and are symmetrical around the common axis of the shafts.

Upon rotation of the two shafts (in opposite or the same direction ), each sealing ring pivots around its eccentric axis under centrifugal force until it abuts against the housing. In this way, an asymmetric sealing clearance is produced. As a result of the angularly offset arrangement of the pivot axes, the sum of the extremely small asymmetric clearances produced by ring overlap is substantially less than the concentric sealing clearance at rest which, in any case is already comparatively small.

According to a feature of the invention, said support means comprises a radially projecting lug on each sealing ring pivotally engaged in a corresponding recess provided in each wall, said lug having a circular cross-section with a center on said pivot axis.

According to a further feature of the invention, the spring means which centers each ring in a biassed position is integral with each ring and projects radially thereof into a second recess provided in the respective wall, said spring means being angularly offset from the pivot axis of the associated ring.

DETAILED DESCRIPTION OF A PREFERRED EMBODIMENT

Figure 1:
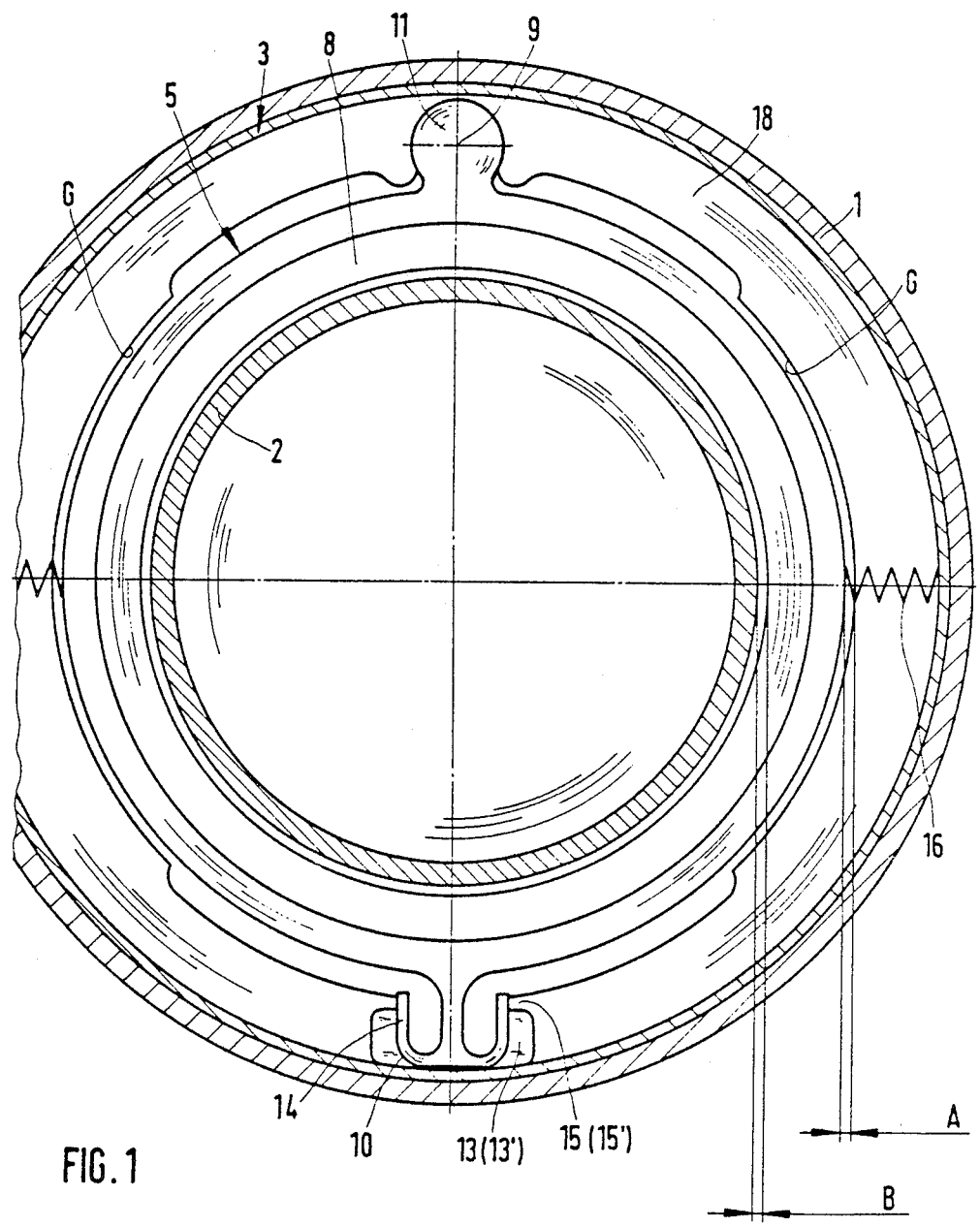
FIG. 1 is a transverse cross-sectional view through a sealing apparatus according to the invention between two relatively rotatable shafts which are at rest.
Figure 2:
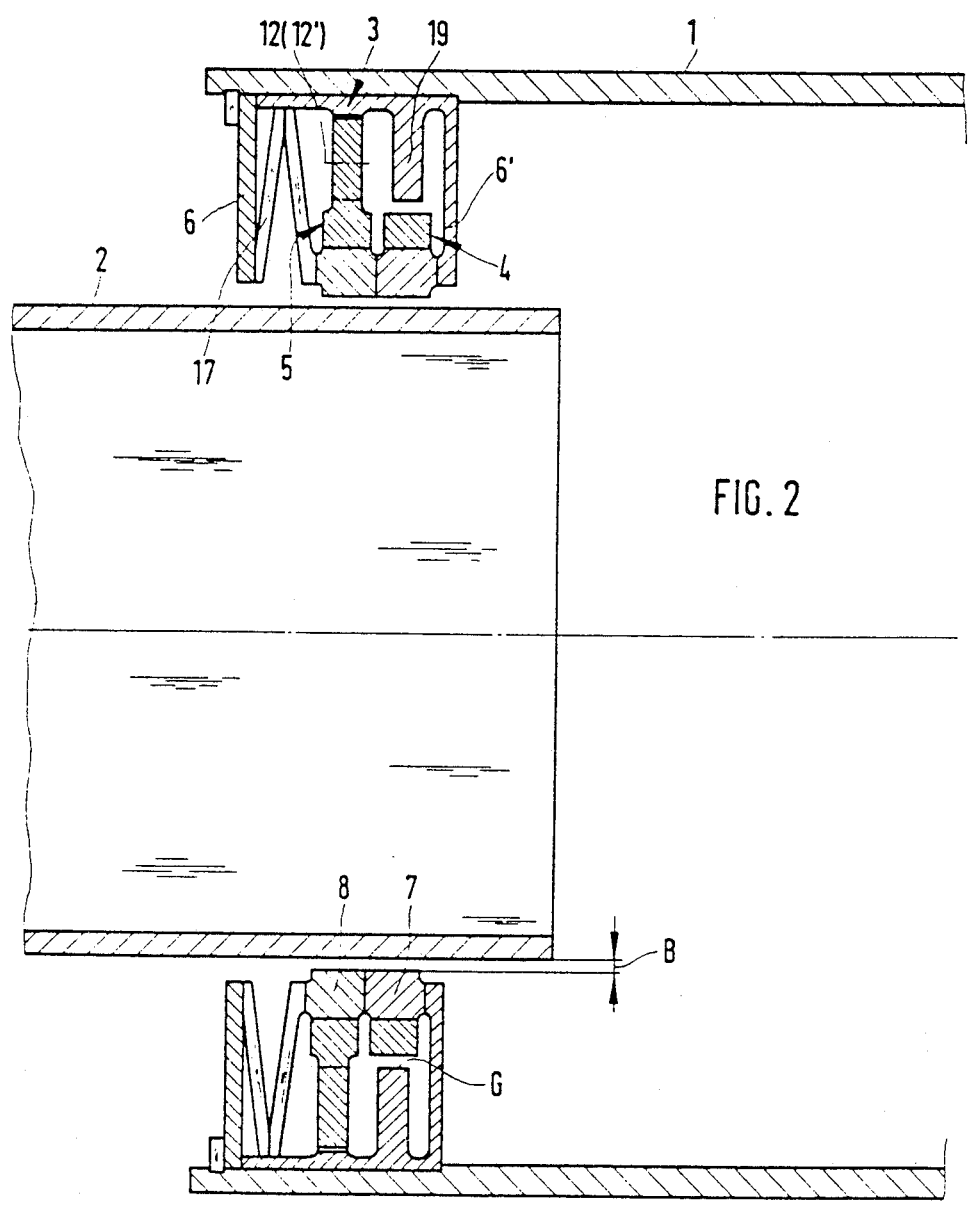
FIG. 2 is a longitudinal cross-sectional view through the structure illustrated in FIG. 1, in which the ring located to the right is rotated angularly through an angle of 90° for illustrative and explanatory purposes.

Referring to FIGS. 1 and 2, therein are seen coaxial outer and inner shafts 1 and 2 which axially overlap one another in spaced relation and are driven in rotation by means (not shown) in the same or opposite directions. The shafts can be part of a gas turbine power plant and can undergo relative rotation.

In accordance with the invention, a sealing apparatus is provided to seal the space between the shafts. The sealing apparatus comprises a housing 3 supporting two sealing or packing rings 4 and 5. The housing 3 has spaced radial walls 6, 6' which extend partially into the space between the two shafts 1, 2 and the two sealing rings 4, 5 are axially biased between the walls by a cup spring 17. Instead of the cup spring 17 any other suitable resilient element can be used, for instance, an undulating washer or the like. Any difference in expansion of structural parts or the shafts can be compensated for by the cup spring 17.

The sealing rings 4, 5 comprise metallic annular support elements 24, 25 for carbon rings 7, 8. In the position of rest, the rings 7, 8 surround the inner shaft 2 with a uniform circumferential gap or clearance B of rotational symmetry.

The carbon rings 7, 8 have confronting circumferential surfaces which sealingly abut against one another as seen in FIG. 2. The carbon rings 7, 8 can be shrunk-fit onto the support elements 24, 25 of the packing rings 4, 5 or secured thereto in any other suitable fashion, such as by bondings or adhesives.

Figure 4:
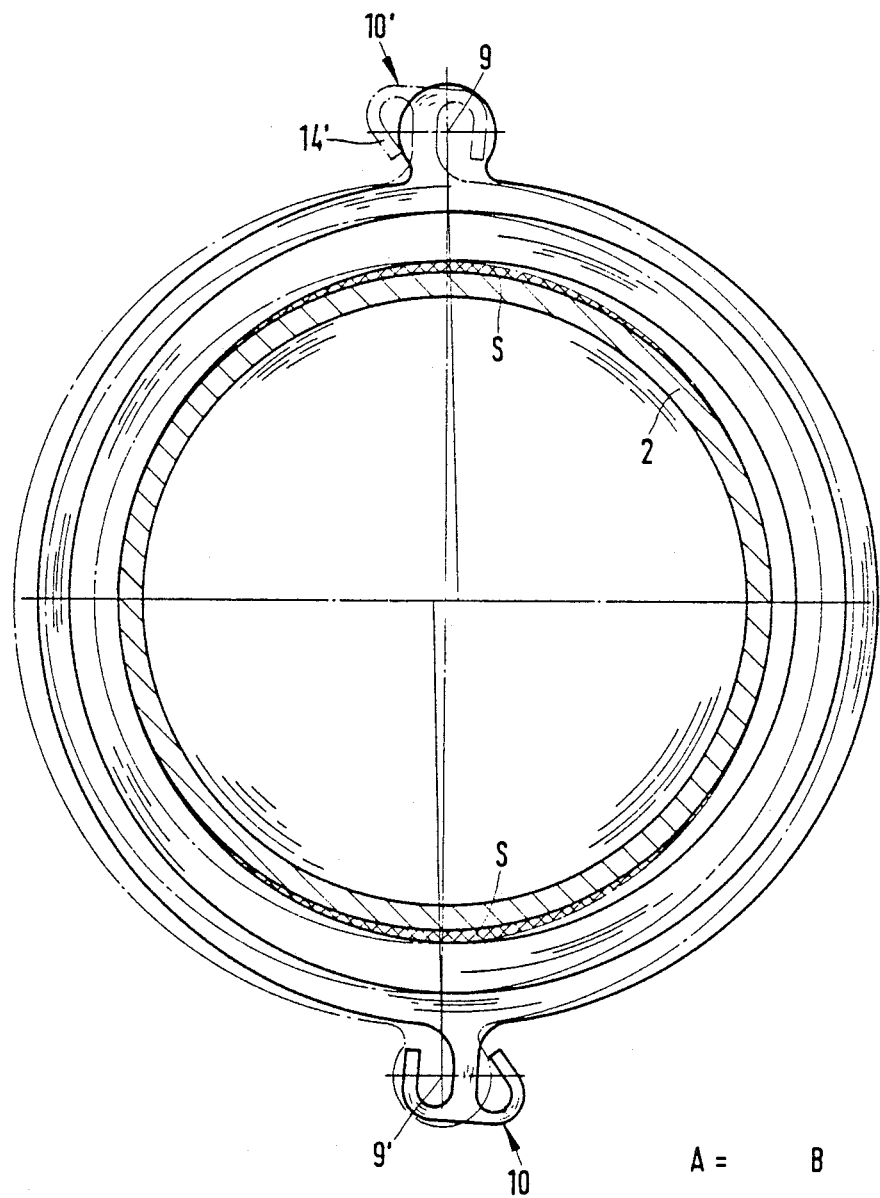
FIG. 4 shows the two rings of the sealing apparatus in operating position with equal predetermined clearances of the rings.

The rings 4 and 5 are of the same construction but are angularly offset of 180° as shown in FIG. 4 where ring 5 is shown in solid outline and ring 4 is shown in chain-dotted outline.

As evident from FIG. 4 the two packing rings 4, 5 are pivotably supported by respective integral lugs 11, 11' from the housing 3 for movement around respective pivot axes 9, 9'. The pivot axes 9,9' are located 180° apart over the circumference of the rings so as to be in diametric opposition to one another. In FIG. 2, the ring 4 is rotated 90° to show the relation between the rings and the shafts. The pivot axes 9, 9' are eccentric from the centers of the rings (located on the common axis of rotation of the shafts) and are disposed in a common longitudinal central plane. Opposite each of the lugs 11, 11' of the rings are respective resilient projections 10, 10', the projection of one ring being adjacent to the lug of the other ring.

The resilient projections 10, 10' serve as spring means to establish, in a position of rest of the shafts 1, 2, the uniform nature of the circumferential clearance B as well as the rotational symmetry of a clearance A between concentric surfaces G of radial walls 18, 19 secured to housing 3 and the confronting outer surfaces of rings 4 and 5.

Figure 3:
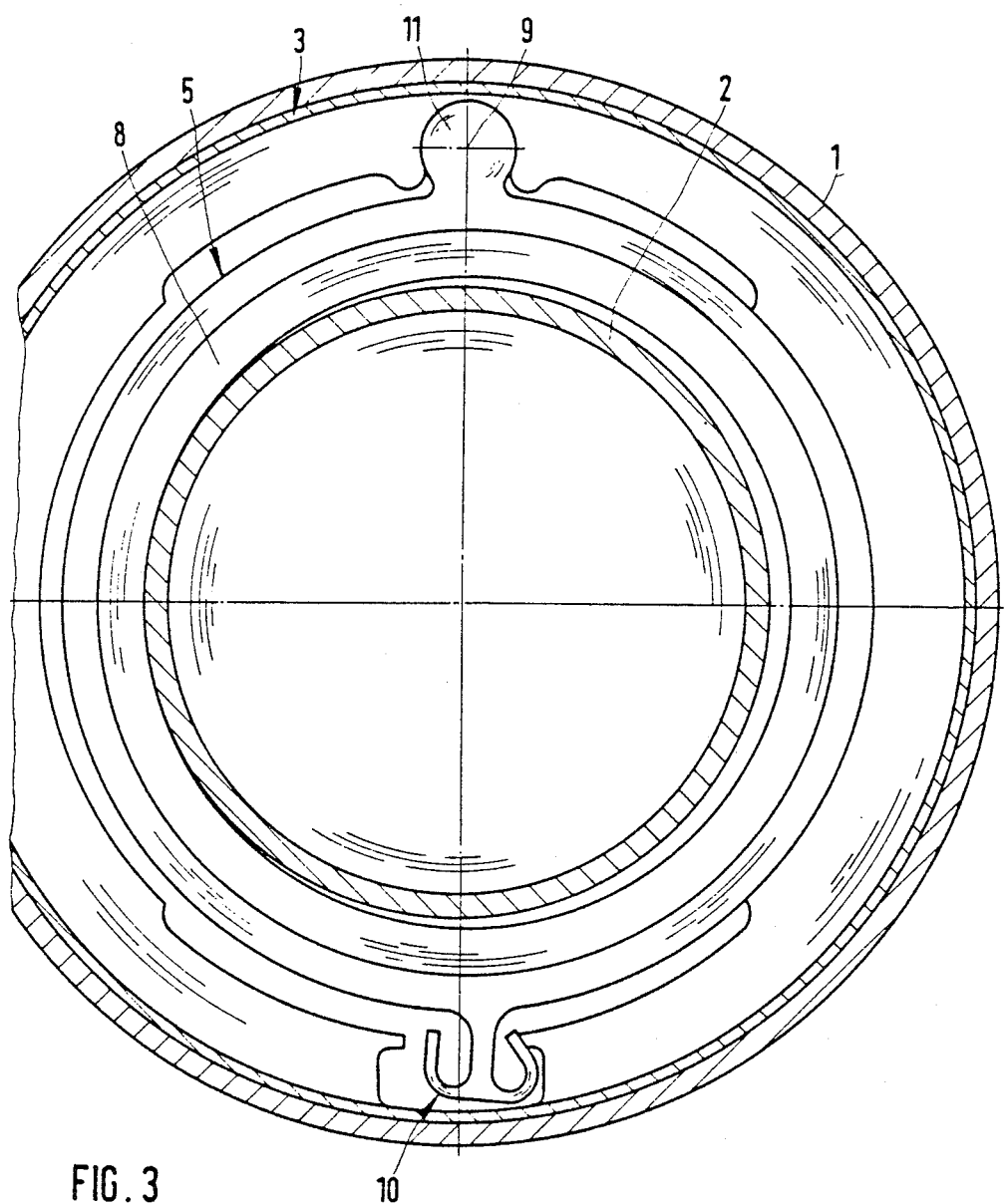
FIG. 3 shows the sealing apparatus of FIG. 1 during rotation of the outer shaft in which one of the rings is in an operating position.

Upon rotation of shaft 1 and the action of centrifugal force produced thereby on the two sealing rings 4, 5, the rings are pivotably displaced round their respective pivot axes 9,9' in opposite directions to take up clearances A and B. FIG. 3 shows ring 5 in a fully displaced position in which ring 5 contacts mating surface G of wall 18 and shaft 2. FIG. 4 shows, in hatched outline, the relatively small crescent-shaped minimum clearances S that remain between the rings 7 and 8 and shaft 2 from the originally concentric circumferential sealing clearance B between the inner peripheral surface of the rings 7 and 8 and the outer surface of shaft 2 (FIG. 1). Namely, due to the eccentric pivotal displacement of the rings 4 and 5 in opposite directions, they collectively reduce the clearance B between rings 7, 8 and shaft 2 to the minimal clearances S while remaining in sealed abutment along their confronting circumferential surfaces.

In FIGS. 1 to 4, the width of the circumferential clearance A is equal to the width of the circumferential clearance B.

Upon a drop in the speed of rotation of shaft 1, for example, by turning the engine off and a consequent reduction in the centrifugal force, the resilient projections 10, 10' act to return the sealing rings 4, 5 to their concentric positions of rest.

This position of rest, as shown in FIGS. 1 and 2, makes possible an extremely simple, unimpeded assembly and disassembly of the shafts.

Figure 5:
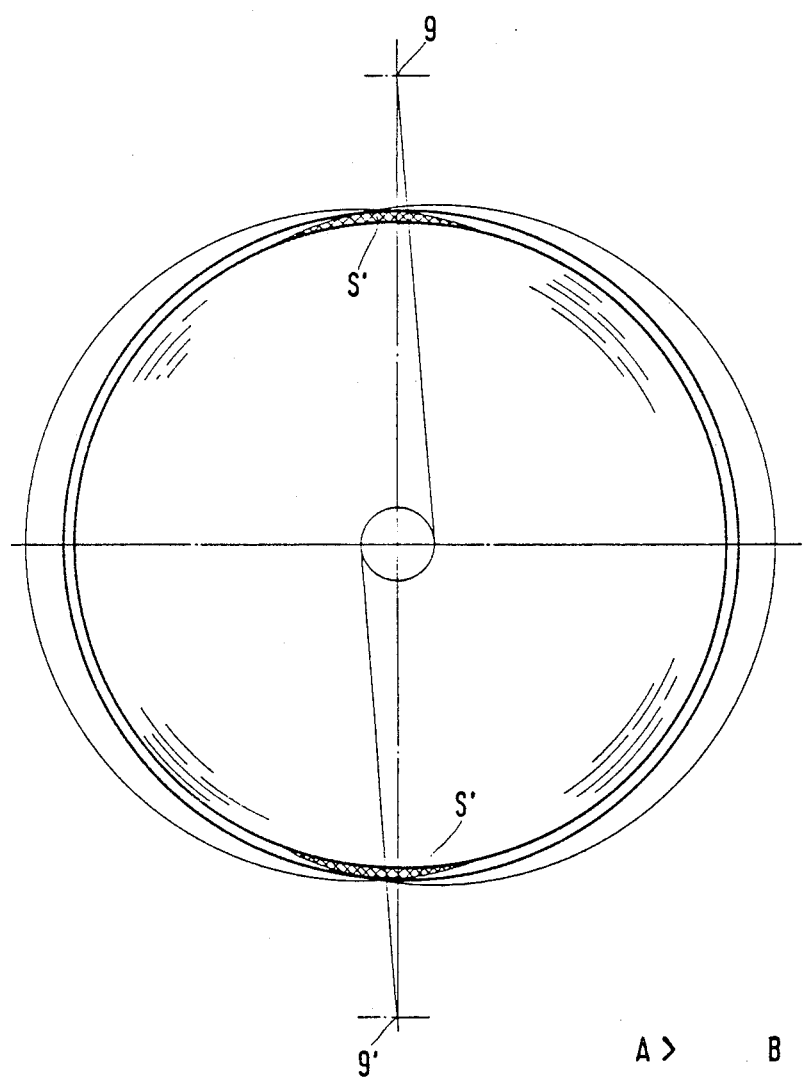
FIG. 5 is a diagrammatic sectional view of the apparatus in FIG. 4 for different predetermined clearances of the rings with respect to the shafts.

In FIG. 5 the width of clearance A is greater than the width of clearance B.

In this case it is necessary to expect wear of the carbon rings 7, 8 along the narrowest points in each case ( running-in process). As evident from the crescent-shaped clearance S' in FIG. 5, the sealing action can be further optimized.

In further accordance with FIG. 1, the lugs 11 and 11' are cylindrical in shape and their centers 12, 12' are coincident with the pivot axes 9, 9' respectively. The cylindrical lugs are supported in corresponding recesses in the radial walls 18, 19 of the housing 3.

The resilient projections 10, 10' which are diameterically opposed to their respective lugs 11,11' are formed by end parts of the sealing rings 4, 5 which project radially in T shape. The projections engage in pocket-shaped recesses 13, 13' in the corresponding radial walls 18, 19. The ends of the top branches of each T-shaped end part are bent radially inwards to form legs 14, 14' which are engaged between projecting end sections 15, 15' of the pocket-shaped recesses 13, 13'.

As shown in FIG. 1, at least one of the two sealing rings, for example, ring 5 in FIG. 1, is supported in resilient centered fashion in the housing 3 by two springs 16 each offset angularly by about 90° from the corresponding pivot axis 9. The springs 16 may be coil springs, spiral springs or the like.

From FIG. 1 it is furthermore seen that the surfaces G on walls 18, 19 are concentric with the axis of rotation of shafts 1, 2 and are provided with steps distributed uniformly over the circumference.

As evident from FIG. 2, the housing 3 can be constructed from individual parts which are rigidly connected to the outer shaft 1. However, it is also possible to make the walls 6', 18 and 19 as integral parts of the shaft 1 and make only the wall 6 as a detachable part. Without shaft disassembly it would then be possible after removal of wall 6, to easily remove the cup spring 17 and then the sealing rings 5, 4 one after the other. Assembly, inspection or replacement can thus be carried out in very simple manner.

This is also true if the wall parts 6', 18, 19 are individual elements rigidly secured to one another and to shaft 1 as shown in FIG. 2.

Although the invention has been described in relation to a specific preferred embodiment thereof, it would become apparent to those skilled in the art that numerous modifications and variations can be made within the scope and spirit of the invention as defined in the attached claims.

What is claimed is:

1. Sealing apparatus between coaxial inner and outer shafts of a gas turbine engine which are rotatable about a common axis, said apparatus comprising two sealing rings mounted on one of the rotatable shafts adjacent one another coaxially around the axis of rotation of the shafts to form a uniform circumferential sealing clearance with the other of the shafts, said rings having circumferential confronting surfaces, abutting one another in sealing relation, a housing secured to said one shaft and including two axially spaced walls extending radially towards said other shaft into spaced relation therewith, means resiliently biassing said sealing rings axially between said walls, support means supporting said rings in said housing for pivotal movement about respective pivot axes which are angularly offset from one another, said rings being supported by said support means to form a second circumferential clearance with the housing, the pivot axis of each ring being radially offset from the axis of rotation of the shafts such that in operation when at least said one shaft is rotated the rings will be displaced under the effect of centrifugal force around said pivot axes within the confines of said second circumferential clearance, and spring means between said housing and said sealing rings for urging said rings to a biassed position in which, when the shafts are at rest, said circumferential clearances are each of uniform width and symmetrical around the common axis of the shafts.

2. Sealing apparatus as claimed in claim 1 wherein each said sealing ring comprises a metal outer support ring element and a carbon inner ring element secured to said outer ring element.

3. Sealing apparatus as claimed in claim 2 wherein said pivot axes of said rings extend parallel to said common axis of the shafts.

4. Sealing apparatus as claimed in claim 3 wherein said pivot axes of said rings are disposed in a common longitudinal plane with said common axis.

5. Sealing apparatus as claimed in claim 1 wherein said rings and said housing have facing surfaces which form said second circumferential clearance, said facing surfaces having steps therein forming steps for said second circumferential clearance which are symmetrically arranged around said second circumferential clearance.

6. Sealing apparatus as claimed in claim 1 wherein said support means supports said rings from said walls respectively.

7. Sealing apparatus as claimed in claim 5 wherein said support means comprises a radially projecting lug on each sealing ring pivotally engaged in a corresponding recess provided in each said wall, said lug having a circular cross-section with a center on said pivot axis.

8. Sealing apparatus as claimed in claim 7 wherein said spring means is integral with each said ring and projects radially thereof into a second recess provided in a respective one of said walls, said spring means being angularly offset from the pivot axis of the associated ring.

9. Sealing apparatus as claimed in claim 8 wherein the angular offset of each spring means is 180° from the respective pivot axis of the respective ring.

10. Sealing apparatus as claimed in claim 9 wherein said spring means comprises a T-shaped radial projection on each ring, said T-shaped projection having a stem with a branch on said stem, said branch having radially inwardly bent ends confined in said second recess.

11. Sealing apparatus as claimed in claim 7 wherein said spring means comprises two diametrically opposed spring elements each at an angle of 90° from the pivot axis of the associated ring.

12. Sealing apparatus as claimed in claim 1 wherein the resilient biasing means comprises a spring element between one of said walls and one of said sealing rings, the resilient biassing means urging the other of said rings against the other of said walls.

13. Sealing apparatus as claimed in claim 1 wherein said housing is fixed in rotation with said outer shaft.

14. Sealing apparatus as claimed in claim 1 wherein said first circumferential clearance is not less than said second circumferential clearance.

15. Sealing apparatus between inner and outer rotatable shafts of a gas turbine engine, said apparatus comprising two sealing rings mounted on one of the rotatable shafts adjacent one another to form a circumferential sealing clearance with the other of the shafts, said rings having circumferential confronting surfaces resiliently abutting one another in sealing relation, support means supporting said rings from said one shaft for pivotal movement about respective pivot axes which are angularly offset from one another, the pivot axis of each ring being radially offset from the axis of rotation of said one shaft such that in operation when at least said one shaft is rotated, the rings will be displaced under the effect of centrifugal force around said pivot axes to collectively reduce said sealing clearance, and means for urging said rings to a biassed position in which, when said shafts are at rest, said circumferential clearance is uniform in width.

16. Sealing apparatus as claimed in claim 15 wherein said pivot axes of said rings extend parallel to the axis of rotation of said one shaft.

17. Sealing apparatus as claimed in claim 15 wherein said support means comprises a radially projecting lug on each sealing ring pivotally engaged in a corresponding recess associated with said one shaft, said lug having a circular cross-section with a center on said pivot axis.

18. Sealing apparatus as claimed in claim 17 wherein said means for urging the rings to a biassed position is angularly offset from the pivot axis of the respective ring and is integral with each said ring and projects radially thereof into a second recess associated with said one shaft.

19. Sealing apparatus as claimed in claim 18 wherein the angular offset of each biassing means is 180° from the pivot axis of the respective ring.

20. Sealing apparatus as claimed in claim 15 wherein the means for biassing the rings comprises two diametrically opposed spring elements each at an angle of 90° from the pivot axis of the associated ring.

* * * * *